United States Patent Office 2,797,761
Patented July 2, 1957

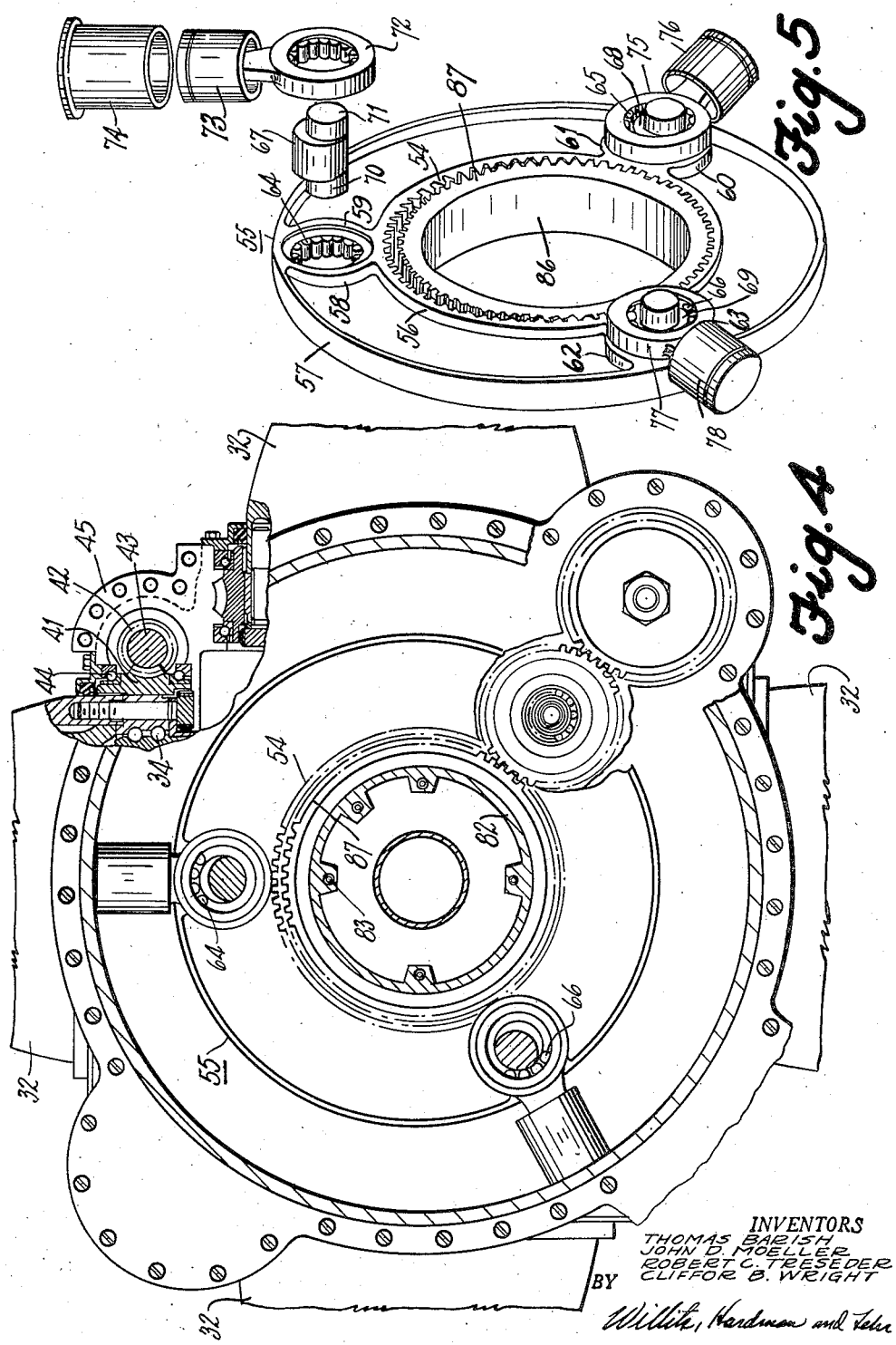

2,797,761

PROPELLER MECHANISM

Thomas Barish, Cleveland, John D. Moeller and Robert C. Treseder, Dayton, and Clifford B. Wright, Tipp City, Ohio, assignors to General Motors Corporation, Detroit, Mich., a corporation of Delaware Application August 27, 1952, Serial No. 306,704

15 Claims. (Cl. 170—160.32)

The present invention relates to variable pitch propellers and more particularly to mechanism for adjusting the pitch position of propeller blades.

Among our objects are the provision of a propeller hub embodying unitary torque unit means for effecting concurrent pitch adjustment of all propeller blades journaled within the hub, and the further provision of such fluid pressure actuated torque unit means that are self-locking in the absence of fluid pressure.

The aforementioned and other objects are accomplished in the present invention by providing a fluid pressure actuated stepping motor within the propeller hub, which stepping motor is operatively connected with each of the several propeller blades rotatably journaled therein. Specifically, the propeller hub assembly is supported for rotation about a fixed hollow shaft. The hollow shaft is supported by a stationary spider that is anchored to nonrotatable aircraft structure. The propeller hub is driven through a compact gear reduction unit including gearing mechanism which effects rotation of the propeller in a direction opposite to that of the prime mover whereby the large gyroscopic effects oppose each other. A fluid pressure regulator is supported fore the propeller hub, as is a brush and slip ring assembly. Valve means within the rotatable regulator control the application of fluid medium under pressure to the stepping motor for effecting adjustment of the blade pitch positions. In addition accumulator chambers are provided within blade supporting spindles of the hub structure, the chambers having connection with pressure developing means disposed within the regulator.

The stepping motor includes an internally toothed ring gear having three transversely extending openings disposed substantially 120° apart. Within each opening, crank pins are rotatably journaled, the crank pins having oppositely extending eccentric pintles which are journaled in plate members. Also journaled on the crank pins are connecting rods that are operatively connected to pistons. The pistons are disposed for reciprocal movement within cylinders, which movement is effected by fluid under pressure. The preceding motor structure is mounted eccentrically with respect to the axis of propeller rotation. Disposed within the internally toothed ring gear, and having only one or two adjacent teeth at a time in load engagement therewith, is a sleeve provided with a pair of axially spaced toothed portions. The sleeve is journaled for rotation about the propeller axis. The teeth of the sleeve and the ring gear differ by three, with the former having the lesser number of teeth. The second toothed portion of the sleeve engages a plurality of planet gears, which in turn are drivingly connected with a plurality of worm shafts associated with the propeller blades. The entire stepping motor assembly rotates with the propeller, and also moves relative thereto when pitch adjustments are being effected.

The valve means within the hub direct fluid pressure sequentially to the stepping motor cylinders, and the order of the sequence determines the direction of ring gear movement relative to the propeller hub. This circular translatory movement is transmitted to the toothed sleeve member, which, in turn, effects movement of the propeller blades through irreversible gear trains. The stepping motor by reason of its eccentric disposition is self-locking in the absence of fluid pressure application thereto.

Further objects and advantages of the present invention will be apparent from the following description, reference being had to the accompanying drawings wherein a preferred embodiment of the present invention will be clearly shown.

In the drawings:

Figs. 1 and 2 combined represent a longitudinal sectional view of the propeller hub and its associated gear reduction unit.

Fig. 4 is a view taken along line 3—3 of Fig. 1 with certain parts removed and including fragmentary sectional details.

Fig. 5 is a perspective view, in part exploded, of the stepping motor assembly.

Figure 1:
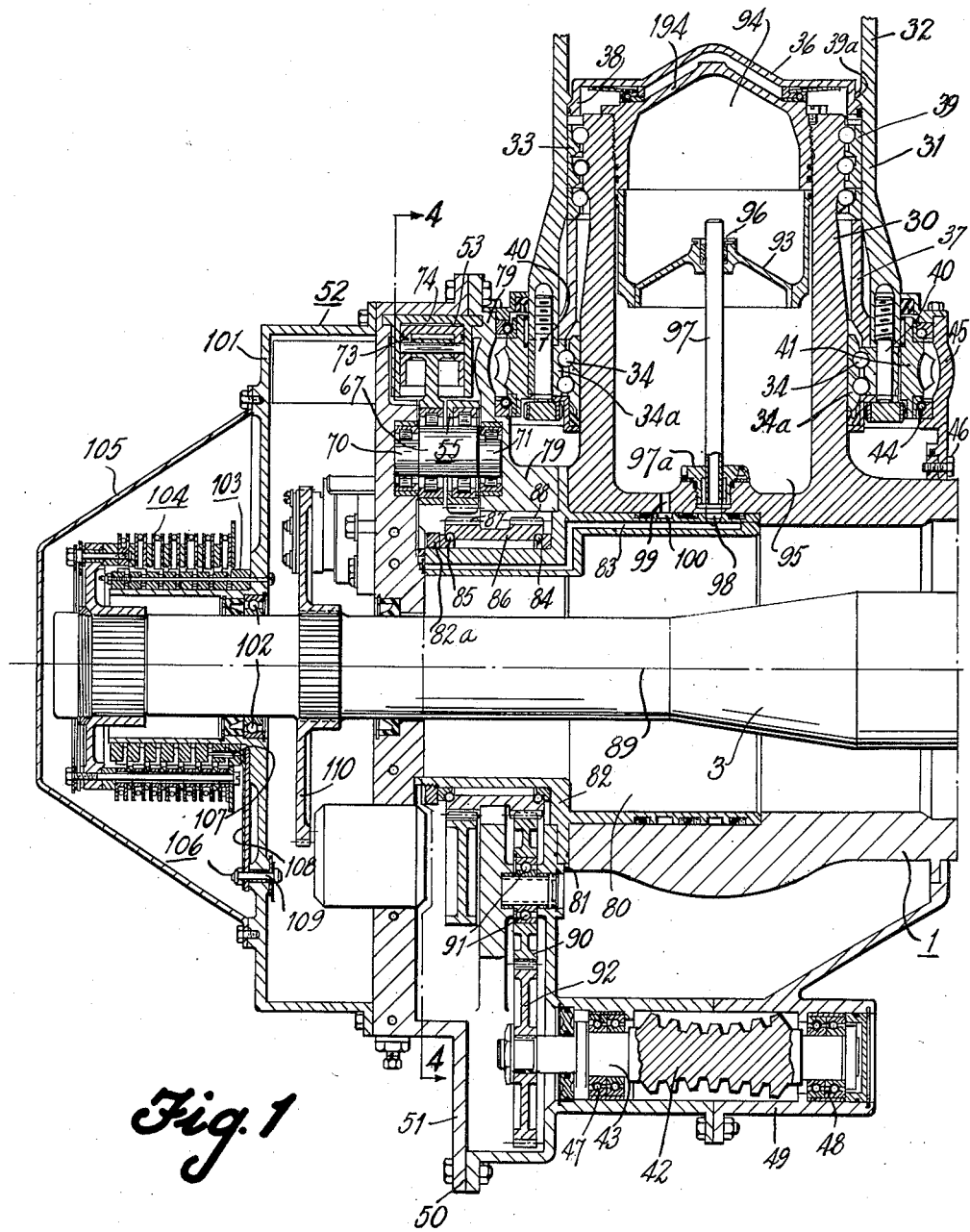
Figure 2:
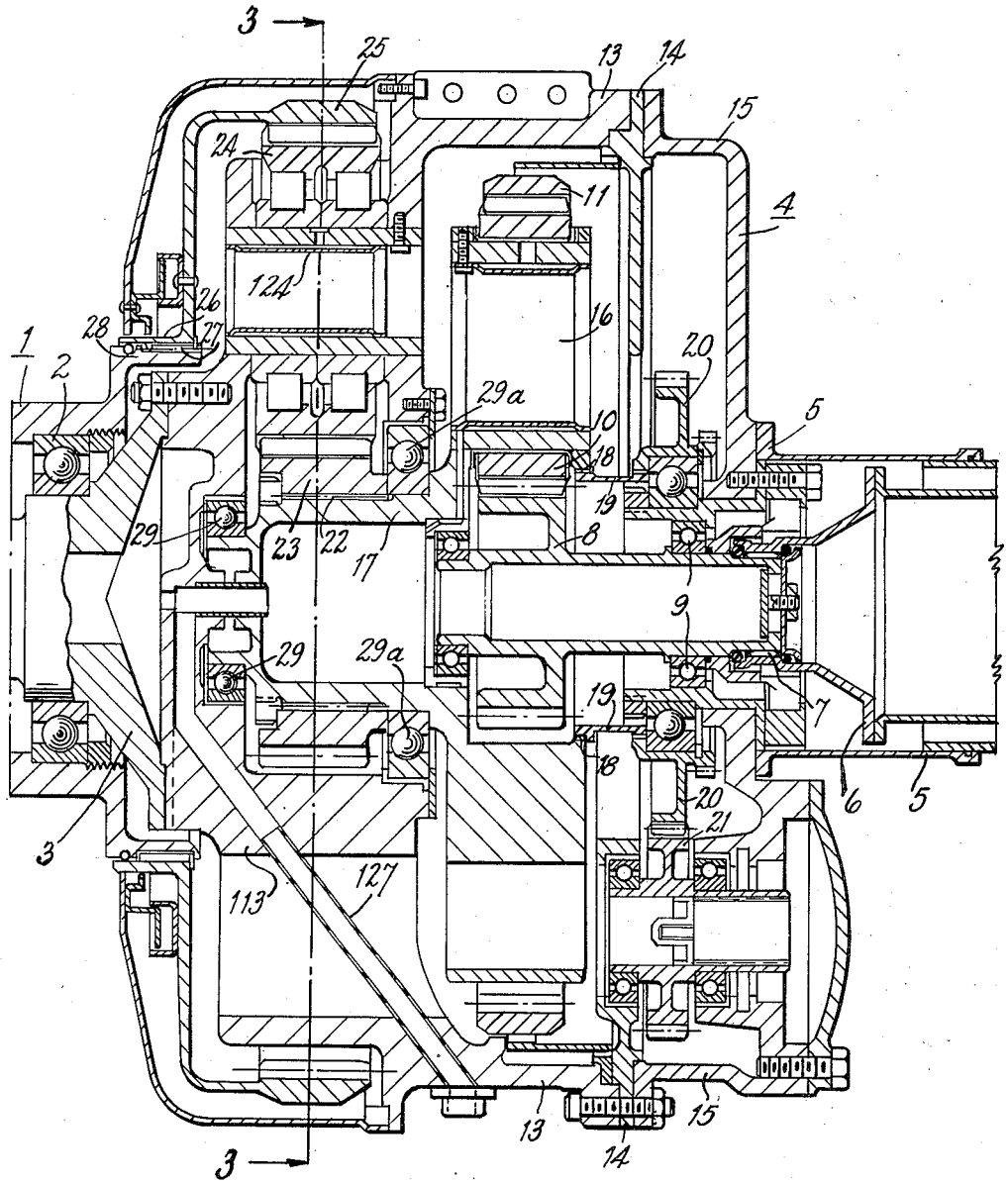

Referring more particularly to Figs. 1 and 2 combined, propeller hub structure 1 is supported by a bearing means 2 upon a fixed hollow shaft 3. The fixed hollow shaft 3 is, in turn, supported by stationary parts of a gear reduction unit 4 that are, in turn, rigidly connected to nonrotatable, rigid portions of the aircraft. Concentrically disposed within a sleeve 5 is a prime mover driven assembly 6. The assembly 6 is splinedly connected at 7 to a shaft of a drive gear 8. The shaft of the drive gear 8 is rotatably supported by bearing means 9 within the gear reduction unit housing 4. The gear 8 meshes with four planet gears, only one, 10, of which is shown. The planet gears mesh with a stationary internal ring gear 11, which is attached to a sleeve that splinedly engages stationary portions 13, 14 and 15 of the gear housing 4. The planet gears, of which 10 is one, are journaled on pins 16, which are attached to a spider or carrier 17 by screw devices. The carrier 17 is rotatably journaled by bearing means 29 and 29a within the portion 13 of the gear housing. The carrier is also splinedly connected at 18 to a sleeve 19 which, in turn, drives a ring gear 20. Meshing with the ring gear 20 are a plurality of pinion gears 21, only one of which is shown. The pinion gears 21 may be used to drive accessories, such as tachometers, generators or alternators. The carrier 17 is also splinedly connected at 22 to a pinion gear 23. The planetary gear set aforedescribed is merely utilized for gear reduction purposes and forms no part of the present invention.

Figure 3:
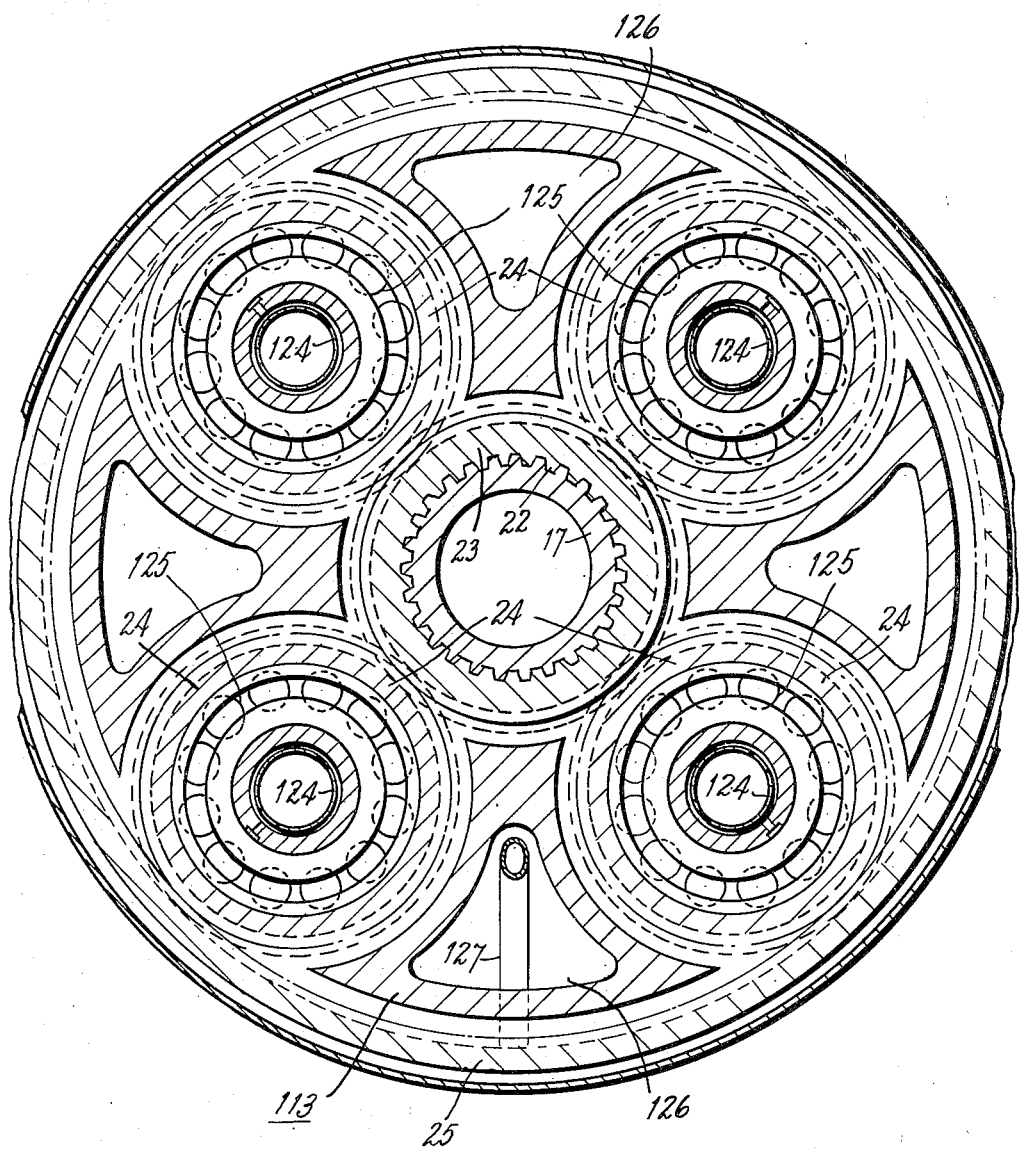
Fig. 3 is a view taken along line 3—3 of Fig. 2 with certain parts removed.

Referring to Figs. 1 and 3, the pinion 23 meshes with four idler gears 24, which are supported by hollow pins 124 and rotatably journaled thereon by bearing means 125 within openings formed in a radially inwardly extending part of the stationary portion 13. The radially inwardly extending part forms a stationary spider 113 through which the fixed shaft 3 is supported. The stationary portion 13 is connected by any suitable means to any nonrotatable aircraft structure, not shown. The stationary spider 113 is also provided with a plurality of openings 126 for weight reduction purposes. A conduit 127, which is utilized to carry control leads, not shown, to the hollow shaft 3, extends through one of the openings 126. The four idler gears 24 mesh with an internal ring gear 25. The internal ring gear 25 is provided with a flange 26 which is splinedly connected at 27 to a flange 28 provided by the hub structure 1. As the prime mover may take the form of a turbine, and as both the turbine and the propeller have large moments of inertia, means are provided for effecting rotation of these units in opposite directions to facilitate the balancing out of the two gyroscopic effects. This reversal of rotation between the turbine driven assembly 6 and the propeller hub 1 is effected through the gear set including pinion 23, idlers 24, and ring gear 25. Moreover, plural power paths are provided between the gear 23 and the ring gear 25, which is connected with the hub 1, by the four idler gears 24 which are journaled within the fixed spider 113. In addition, the stationary spider 113 supports the fixed hollow shaft 3 by reason of the flanged connection therebetween.

Referring more particularly to Figs. 1, 4 and 5, the propeller hub structure 1, which is driven by and supported through a compact gear reduction unit aforedescribed, will now be dealt with in detail. The propeller hub structure 1 is provided with four radially extending spindles 30, one of which is shown in Fig. 1. The spindles are disposed 90 degrees apart and are of hollow construction. Coaxially disposed about each of the hollow spindles are the hollow shanks of propeller blades. As is shown in Fig. 1, the hollow shank portion 31 of a propeller blade 32 is supported for movement about its longitudinal axis about the spindle 30 by stacked bearing means 33 and radial bearing means 34. The inner raceways of the stack bearings 33 are formed integral with the outer circumferential surface of the spindle 30. The outer races 39 of the stack bearings 33 are interposed between an annular member 36 and a hollow sleeve 37. The annular member 36 is provided with a flange 38, which engages an internal shoulder 39a formed on the internal surface of the shank 31. The sleeve 37 is maintained between the outer races 39 of the stacked bearing 33 and the outer race of the radial bearing 34 by means of a plurality of bolts 40, which engage ring 34a forming the outer raceways of bearings 34 and threadedly engage the shank portion 31 of the propeller blades. The centrifugal thrust of the blades is transmitted through the sleeves 37 to the stacked bearings 33. Each of the propeller blades 32 has secured to the blade shank end thereof a worm gear 41. The worm gears 41 are disposed to engage worm wheels 42, which are fixed to worm shafts 43, as is shown in Figs. 4 and 1. The worm wheels 41 are journaled for rotation within the propeller hub structure 1 by bearing means 44. The bearing means 44 are supported by a cover structure 45, which is anchored to the propeller hub 1 by screw devices 46.

Referring to Fig. 1, the worm shafts 43 are journaled by bearing means 47 and 48 in tubular portion 49 of the cover structure 45. One end of the cover structure 45 is flange connected at 50 to a plate member 51 which forms one wall of a fluid pressure regulator designated generally by 52. Disposed between the plate 51 and the spindles 30 is a stepping motor type torque unit means 53.

Referring particularly to Fig. 5, the component parts of the stepping motor assembly 53 will be described in detail. The stepping motor includes an internally toothed ring gear 54. The ring gear 54 forms part of a toroid, which includes inner and outer rim members 56 and 57 that are integral with pairs of arcuate members 58 and 59, 60 and 61, 62 and 63, which pairs are disposed substantially 120° apart. Each pair of arcuate members provides a circular opening within which are mounted roller bearing assemblies 64, 65 and 66. Journaled within roller bearing assembly 64 is a crank pin 67 and, likewise, journaled within roller bearing assemblies 65 and 66 are crank pins 68 and 69, respectively. The crank pin 67 is provided with oppositely extending eccentric pintle portions 70 and 71. The crank pins 68 and 69 are, likewise, provided with oppositely extending eccentric pintle portions. Rotatably journaled on the crank pin 67 is a connecting rod 72, the connecting rod being operatively connected with a piston 73. The piston 73 is adapted for reciprocal movement within a cylinder 74. In a like manner, a connecting rod 75, connected with a piston 76, is rotatably journaled on the eccentric pin 68, as is crank arm 77 and its piston 78 associated with crank pin 69. The pistons 76 and 78 are each mounted for reciprocal movement within separate cylinders, not shown in Fig. 4. Referring again to Fig. 1, the cylinder 74 is shown rigidly attached to the plate 51. The cylinders which are associated with pistons 76 and 78 are likewise disposed within the propeller hub structure. Eccentric pintle 70 of the crank pin 67 is rotatably journaled by a bearing means within the plate 51. The eccentric pintle 71 of the crank pin 67 is rotatably journaled by bearing means in a second plate 79, which is suitably attached to the rotating propeller hub 1. Disposed within the hollow bore 80 of the hub 1 and flange connected thereto at 81 is a stepped sleeve member 82. The stepped sleeve member 82 is provided with a plurality of passages, one, 83, of which is shown in Fig. 1, the purpose of which will be later described. Rotatably journaled by bearing means 84 and 85 upon the sleeve 82 is a second sleeve 86 having axially spaced externally toothed portions 87 and 88.

Referring again to Fig. 5, toothed portion 87 of the sleeve 86 is adapted for engagement with the internally toothed ring 54 of the toroid assembly 55. The parts are so constructed that the number of the teeth on portion 87 of the sleeve are three less than appear on the internally toothed ring gear 54. Thus, with the toroid assembly 55 eccentrically mounted with respect to the axis 89 of propeller rotation, while the sleeve 86 is journaled for rotation about the axis 89, each circular translatory movement of the toroid 55 will rotate the sleeve 86 throughout an arcuate distance of three teeth. In this manner, automatic gear reduction between the toroid 55 and the sleeve 86 is obtained. Moreover, the parts are so arranged that the load is transmitted between ring gear 54 and toothed portion 87 through only one or two adjacent teeth at a time.

Referring again to Fig. 1, the externally toothed portion 88 of the sleeve 86 meshes with a planet gear 90, which is rotatably journaled by bearing means 91 within a radially inward extension of the cover assembly 45. Four planet gears 90 are provided and each of the planet gears meshes with a pinion gear 92, which is anchored to one end of the worm shaft 43. The sleeve 86 is maintained in position upon the sleeve 82 by means of a ring 82a, which threadedly engages an external portion of the sleeve 82.

During rotation of the propeller, the entire assembly, except for fixed shaft 3, rotates. By reason of the three crank pins of the stepping motor being united through the toroid 55, they effectively act as the three throws of a crank shaft, the throws being displaced 120°. Moreover, the toroid 55 can only be moved in a circular translatory path about the crank pin axes through sequential actuation of the pistons associated with the crank pins. If the fluid pressure system or the control system therefor fails, the toroid will automatically lock at the dead center position at any one of the crank pins. Accordingly, the torque unit is self-locking upon any malfunction occurring in the control system. This, in effect, constitutes an automatic pitch lock for the propeller blades during the absence of fluid pressure application to the stepping motor piston and cylinder combination. To effect adjustment in the pitch position of the blades 32, the toroid assembly 55 must be moved relative to its associated rotatable structure including plates 51 and 79.

To effect relative movement between the toroid 55 and the plates 51 and 79, fluid pressure must be applied in a predetermined sequence to the cylinders associated with pistons 73, 76 and 78. For instance, if fluid pressure is first applied to cylinder 74, a radial inward movement of the piston 73 to the dead center position of the crank pin 67, followed by inwardly radial movement of pistons 76 and 78 in that order will effect a movement of the toroid assembly 55 about the axes of the crank pins relative to the plates 51 and 79. This circular translatory motion of the assembly 55 will effect an arcuate movement of the sleeve 86 through toothed engagement between gear portions 87 and 54. Arcuate movement of the sleeve 86 will be transmitted through toothed portion 88, planet gears 90, pinion gears 92 to the worm shafts 43, which through the worm gear 42 will effect rotative movement of the worm wheels 41 that are operatively connected to the propeller blades 32. In this manner, each of the several propeller blades will be moved through exactly the same angular distance whereby concurrent pitch adjustment is effected.

Disposed within each of the hollow spindles 30 is a free piston 93, which divides the hollow spindles into a gas chamber 94 and a hydraulic fluid pressure chamber 95. The chamber 94 is closed at its outer end by a head member 194. The piston 93 is centrally apertured at 96 and is adapted to slide along the surface of a transfer tube 97, which is secured at its inner end to a tubular nut 97a having threaded engagement with a boss formed on the hub structure 1. Passage 83, within the stepped sleeve 82, communicates with a pocket 98, which, in turn, communicates with the transfer tube 97 to provide means for admitting gas under pressure to the chamber 94. Chamber 95 is connected by a bore 99 to a pocket 100 within the sleeve 82 which is connected by a passage, not shown, in the sleeve 82 to a passage within the plate 51 for supplying fluid medium under pressure to the chambers 95. The connecting passages between the hollow spindles and the plate 51 are similar to those shown in the Blanchard et al. Patent 2,307,102. Thus, it is seen that the hollow spindles 30 may be used to provide accumulator chambers for the storage of hydraulic fluid medium under pressure.

A regulator cover 101 is supported by bearing means 102 upon the fixed shaft 3. Attached to the cover 101 is a slip ring assembly 103. Attached to the end of shaft 3 is a brush assembly 104, which cooperates with the slip ring assembly 103. Leads for conducting electric energy to the brush assembly 104 are disposed within the hollow shaft 3. The brush and slip ring assembly is enclosed by a cover 105, which is flange connected to the regulator cover 101. Connection between the several slip rings and the interior of the regulator 52 is accomplished by terminal structure such as is shown at 106. The terminal structure includes a pin 107, which engages a slip ring at one end, the other end of the pin engaging a spring contact 108, which is insulatingly supported on the cover 101. The spring contact 108 is, in turn, connected by a terminal stud 109 to the interior of the regulator 52. Mounted within the regulator 52 and restrained from rotation by means of the fixed shaft 3 is an externally toothed gear 110. The gear 110 may be used to operate a system pump for developing fluid pressure in a manner similar to that disclosed in the aforementioned Blanchard et al. patent. Disposed within the regulator 52 and attached to the plate 51 are the several elements of a fluid pressure control system for effecting movement of the pistons associated with the stepping motor.

Figure 6:
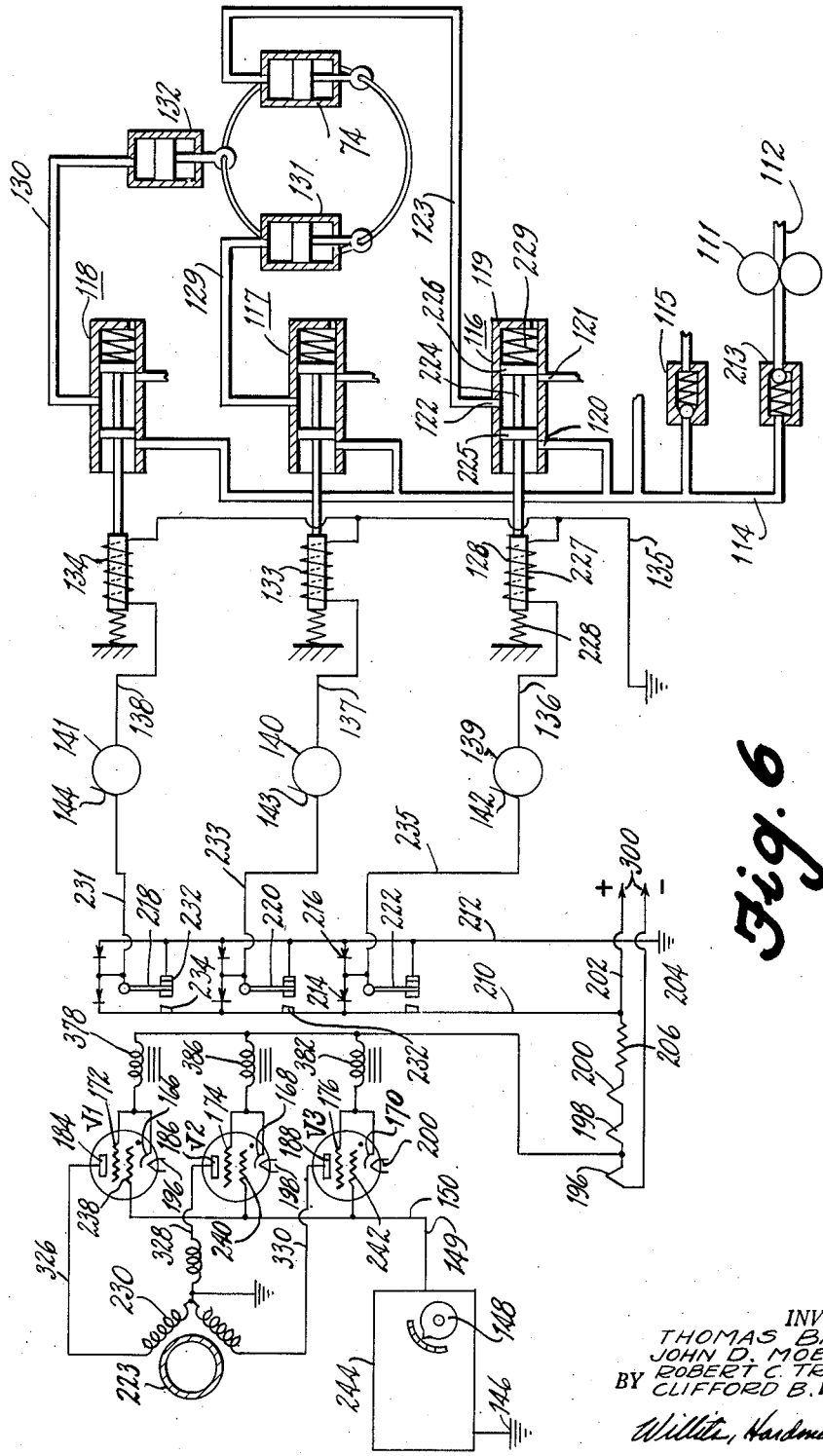
Fig. 6 is a schematic diagram of a control system which may be utilized to effect control of the stepping motor.

Referring to Fig. 6, a schematic control system for the instant propeller is shown. The control system is by way of example and not by way of limitation. The fluid pressure control circuit includes a pump 111, which may be driven by relative rotation between the power gear 110 and the regulator plate 51. The gear type pump 111 has an inlet at 112, which communicates with the reservoir formed by members 101 and 51, which sealingly engage the fixed shaft 3. The output of the pump 111 flows through a check valve 213 and into a high pressure trunk line 114. Pressure in the trunk line 114 is controlled by a pressure relief valve 115. The trunk line 114 communicates with the supply ports of three solenoid actuated valves 116, 117 and 118. As all of the valves are of identical construction, a detailed description of one is deemed to be sufficient. Solenoid actuated valve 116 includes a valve guide 119 having a supply port 120, a drain port 121 and a distribution port 122. The supply port is connected to the trunk line 114, the distribution port is connected by line 123 to cylinder 74 of the stepping motor. Disposed within the valve guide 119 is a plunger 224, normally centered by a pair of springs 228 and 229, having a pair of spaced lands 225 and 226. One end of the plunger is provided with an armature 227, which is encompassed by solenoid winding 128. Each of the solenoid valves is so constructed that during solenoid winding deenergization, the lines 123, 129 and 130, which lead to the stepping motor cylinders 74, 131 and 132, respectively, are connected to drain. During energization of solenoid windings 128, 133 and 134, the lines 123, 129 and 130, respectively, are connected through the supply ports to the trunk line 114. One end of each of the solenoid windings 128, 133 and 134 is connected to ground by a common conductive line 135. The other ends of windings 128, 133, 134 are connected, respectively, by conductive lines 136, 137 and 138 to slip rings 139, 140 and 141. Slip rings 139, 140 and 141 are, respectively, contacted by brushes 142, 143 and 144. The brushes 142, 143 and 144 are, in turn, connected by electric lines to means for sequentially energizing the solenoid windings 128, 133 and 134 to effect substantially constant speed propeller operation. Structurally, the brushes 142, 143 and 144, and the slip rings 139, 140, and 141, form part of the brush and slip ring assembly 103, 104 shown in Fig. 1.

The control means for sequentially energizing the solenoid windings 128, 133 and 134 includes an electronic discriminator circuit. This circuit comprises a standard signal source in the form of a stable adjustable single phase A. C. generator 244 and a three-phase alternator including an armature 223 with a stator winding 230. The armature 223 is driven at a speed proportional to the speed of rotation of propeller hub 1 and produces signals displaced 120 electrical degrees apart on the windings of stator 230. Accordingly, the frequency of the three phases appearing on the windings of stator 230 is proportional to the speed of rotation of the hub 1. The frequency of the single phase A. C. generator 244 may be varied by adjustment of element 148, which, in effect, forms a pilot's speed control. This signal generator produces an A. C. voltage between conductor 149 and ground 146, the frequency of which is dependent upon the pilot control adjustment 148. This signal is impressed on the conductor 149 from which it is simultaneously impressed on grids 238, 240 and 242 of thyratron tubes V1, V2 and V3 by means of conductor 150. The tubes V1, V2 and V3 include plates 184, 186 and 188; screen grids 172, 174 and 176, the control grids 238, 240 and 242, cathodes 166, 168 and 170 and filaments 196, 198 and 200. The filaments are energized in series by a voltage divider network including resistance 206 and are connected between conductors 202 and 204 between the terminals of a D. C. power source 300.

The three phases, 120 electrical degrees apart, that are developed by the armature in the windings of stator 230 are sequentially impressed upon the plates 184, 186 and 188 of the thyratrons, V1, V2 and V3 by means of conductors 326, 328 and 330, respectively. Thus, the tubes are given a positive plate potential in sequence, 120 electrical degrees apart. However, the control grids 238, 240 and 242 of these tubes that are simultaneously impressed with a signal from the generator 244 which, when positive, places all three tubes in a conductive condition. Accordingly, each of the tubes will conduct whenever both its plate and grid have positive potentials of correct magnitude impressed thereon coincidentally. It may therefore be seen that only one tube will conduct at a time. The screen grids 172, 174 and 176 are directly connected to the cathodes 166, 168 and 170. The cathode circuit of tube V1 is through a relay coil 378, the energization of which effects movement of armature 218 of the relay away from contact 232 so as to close with contact 234. This energization takes place whenever the tube V1 conducts. The cathode circuit of V2 is similarly connected through relay coil 386, which controls armature 220, and the cathode circuit of tube V3 is likewise connected through relay coil 382 which controls armature 222. As each of the circuits associated with the relay armatures are alike, a description of one is deemed to be sufficient. The relay circuits include a pair of contacts 232 and 234 with the armature disposed therebetween. The contacts 234 are connected by a conductive line 210 with the power source 390. Inserted between the armature and the conductive line 210 is a rectifier 214, which is used for arc suppression at the relay contacts. Contacts 232 are similarly connected with rectifiers 216 to a conductive line 212 and ground. The armatures 218, 220 and 222 connect by lines 231, 233 and 235 to the brushes 142, 143 and 144.

In operation the three-phase signal of the alternator is balanced against the single phase master signal by means of the discriminator circuit to produce a control signal depending upon the relative frequency difference between the signal generator 244 and the alternator windings 230. This control signal is used to adjust the load on the engine propeller combination so as to increase or decrease the speed thereof, which, in turn, increases or decreases the frequency of the alternator so that the alternator signal and the reference generator signal are brought into synchronism, which represents an onspeed condition.

*Operation*

If the propeller is operating at a speed above that selected, the tubes will conduct in the sequence of V1, V2 and V3 due to the sequence of coincidence between positive plate pulses and positive grid pulses. This will, in turn, cause sequential energization of the solenoid windings 128, 133 and 134. Energization of the solenoid windings in this order will effect application of hydraulic fluid pressure to the cylinders 74, 131 and 132 in the same order which will effect counterclockwise circular translatory movement of gear 54, as viewed in Fig. 5. This counter-clockwise movement of gear 54 will, in turn, effect counterclockwise movement of ring gear 87 which, through its transmission, will effect an increase in the pitch position of the blades 32 in an effort to correct the overspeed condition. When the propeller speed returns to the preselected level, the energization of tubes V1, V2 and V3 will be such that positive pulses coincide in only one of the tubes. Likewise, only one and the same solenoid winding will be sequentially energized and deenergized. However, reciprocal movement of only one of the pistons cannot cause circular translatory movement of the toroid assembly 55 due to dead centering of the crank pins during movement of the pistons. Thus, the periodical reciprocal movement of one of the pistons will not effect movement of the toroid assembly 55. If the propeller speed should be less than the selected speed, the tubes will conduct in the sequence V3, V2, V1, thereby effecting clockwise circular translatory movement of the toroid 55 and a consequent movement of the propeller blades to a lesser pitch position.

While the embodiment of the present invention as herein disclosed, constitutes a preferred form, it is to be understood that other forms might be adopted.

What is claimed is as follows:

1. In a variable pitch propeller having blades mounted for adjustment in pitch position, the combination including, a rotatable propeller hub, means mounting said blades for rotation about their longitudinal axes relative to said hub, a stepping motor assembly rotatable with said hub and adapted for movement relative to said hub, said stepping motor assembly including a member carried by said hub and mounted for eccentric movement with respect to the axis of propeller rotation, said member having a plurality of circumferentially spaced openings therein and a plurality of reciprocable pistons having operative connection with said openings whereby sequential actuation of said pistons will effect eccentric movement of said member relative to said hub, means interconnecting said member and said blades whereby movement of said member relative to said hub will adjust the pitch position of said blades, and means for sequentially actuating said pistons to effect movement of said member relative to said hub.

2. Mechanism for effecting movement of propeller blades about their longitudinal axes including, a first toothed member, a plurality of reciprocally movable pistons, eccentric means interconnecting said pistons and said first toothed member whereby sequential reciprocal movement of said pistons will effect circular translatory movement of said first toothed member, a second toothed member offset from the axis of said toothed member and in operative engagement therewith, said toothed members having different numbers of teeth, and means interconnecting said second toothed member with said blades whereby movement of said second toothed member caused by movement of said first toothed member will effect movement of said blades about their axes.

3. Means for effecting movement of propeller blades about their longitudinal axes including, an internally toothed member, a plurality of reciprocally movable pistons, eccentric means interconnecting said pistons and said internally toothed member whereby sequential reciprocal movement of said pistons will effect circular translatory movement of said internally toothed member, an externally toothed member offset from the axis of said internally toothed member and in toothed engagement therewith, said externally toothed member having a lesser number of teeth than said internally toothed member, and means interconnecting said externally toothed member with said propeller blades whereby movement of said externally toothed member caused by circular translatory movement of said internally toothed member will effect movement of said blades about their axes.

4. Mechanism for effecting movement of propeller blades including, in combination, a source of fluid pressure, a plurality of fluid pressure operated piston and cylinder combinations, means interconnecting said pistons and said blades whereby the order in which said pistons are actuated determines the direction of blade movement, a valve connected between said source and each of said cylinders for controlling the actuation of said pistons, and means controlling the operation of said valves whereby the direction of blade movement can be controlled.

5. Mechanism for effecting movement of propeller blades including, a source of fluid pressure, three fluid pressure operated piston and cylinder combinations, means operatively interconnecting said pistons and said blades whereby the sequence of piston movement determines the direction of blade movement, a valve connected between said source and each of said cylinder and piston combinations, and means controlling the actuation of said valves whereby the direction of blade movement can be controlled.

6. In a variable pitch propeller having blades mounted for adjustment in pitch position, the combination including, a rotatable propeller hub, means mounting said blades for rotation about their longitudinal axes relative to said hub, a stepping motor assembly rotatable with said hub and adapted for movement relative to said hub, said stepping motor assembly comprising a member carried by said hub and mounted for eccentric movement with respect to the axis of propeller rotation, said member having a plurality of circumferentially spaced circular openings therein, eccentric means rotatably supported in each of said circular openings and a plurality of reciprocable pistons, each piston having operative connection with one of said eccentric means whereby sequential actuation of said pistons will effect eccentric movement of said member relative to said hub, means interconnecting said member with said blades whereby movement of said member relative to said hub will adjust the pitch position of said blades, and means for sequentially actuating said pistons to effect movement of said member relative to said hub and thereby adjust the pitch position of said blades.

7. In a variable pitch propeller having blades mounted for adjustment in pitch position, the combination including, a rotatable propeller hub, means mounting said blades for rotation about their longitudinal axes relative to said hub, a stepping motor assembly rotatable with said hub and adapted for movement relative to said hub, said stepping motor assembly comprising a member carried by said hub and mounted for eccentric movement with respect to the axis of propeller rotation, said member having a plurality of circumferentially spaced, circular openings therein, a crank pin rotatably journaled in each circular opening and having oppositely extending eccentric pintles rotatably supported in said hub and a plurality of reciprocable pistons, each piston having operative connection with one of said crank pins whereby sequential actuation of said pistons will effect eccentric movement of said member relative to said hub, means interconnecting said member with said blades whereby movement of said member relative to said hub will adjust the pitch position of said blades, and means for sequentially actuating said pistons to effect movement of said member relative to said hub and thereby adjust the pitch position of said blades.

8. In a variable pitch propeller having blades mounted for adjustment in pitch position, the combination including, a rotatable propeller hub, means mounting said blades for rotation about their longitudinal axes relative to said hub, a stepping motor assembly rotatable with said hub and adapted for movement relative to said hub, said stepping motor comprising a member carried by said hub and mounted for eccentric movement with respect to the axis of propeller rotation, said member having a plurality of circumferentially spaced circular openings therein, a crank pin rotatably journaled in each circular opening and having oppositely extending eccentric pintles rotatably supported in said hub, a plurality of reciprocable pistons and a connecting rod for each piston, each connecting rod having one end operatively connected to its respective piston and the other end rotatably supported on one of said crank pins whereby sequential actuation of said pistons will effect eccentric movement of said member relative to said hub, means interconnecting said member with said blades whereby movement of said member relative to said hub will adjust the pitch position of said blades, and means for sequentially actuating said pistons to effect movement of said member relative to said hub and thereby adjust the pitch position of said blades.

9. In a variable pitch propeller having blades mounted for adjustment in pitch position, the combination including, a rotatable propeller hub, means mounting said blades for rotation about their longitudinal axes relative to said hub, a member rotatable with said hub and mounted eccentrically with respect to the axis of propeller rotation, said member being adapted for circular translatory movement relative to said hub, means interconnecting said member and said blades whereby movement of said member relative to said hub will adjust the pitch position of said blades, actuating means operatively connected with said member for effecting circular translatory movement thereof, and means for controlling the operation of said actuating means, said actuating means including a plurality of piston and cylinder combinations, said cylinders being attached to and rotatable with said hub, said pistons being disposed in said cylinders and mounted for reciprocal movement therein and means interconnecting said pistons and said member whereby reciprocal movement of said pistons will effect circular translatory movement of said member, said means for controlling the operation of said actuating means including a source of fluid pressure, a plurality of valves equal in number to the number of said piston and cylinder combinations, and passage means connecting said source to said valves and said valves with said cylinders and means controlling the sequence of valve operation whereby the sequence of piston actuation and the direction of movement of said member may be altered.

10. In a variable pitch propeller having blades mounted for adjustment in pitch position, the combination including, a rotatable propeller hub, means mounting said blades for rotation about their longitudinal axes relative to said hub, a member rotatable with said hub and mounted eccentrically with respect to the axis of propeller rotation, said member having an internal ring gear integral therewith and adapted for circular translatory movement relative to said hub, a sleeve journalled for rotation about the axis of propeller rotation having a first toothed portion in mesh with said ring gear for rotation by said member, said sleeve having a second toothed portion, gear means interconnecting the second toothed portion of said sleeve and said blades whereby movement of said member relative to said hub will adjust the pitch position of said blades, actuating means operatively connected with said member for effecting circular translatory movement thereof, and means for controlling the operation of said actuating means.

11. In a variable pitch propeller having blades mounted for adjustment in pitch position, the combination including, a rotatable propeller hub, a regulator attached to and rotatable with said hub, a plurality of propeller blades mounted within said hub for rotation about their longitudinal axes, a toroid rotatable with said hub and mounted eccentrically with the axis of propeller rotation, said toroid having an internal ring gear integral therewith and adapted for movement relative to said hub, a member journalled for rotation about the axis of propeller rotation having a first gear portion engaging only a portion of said ring gear for rotation by said toroid, said member having a second gear portion, gear means interconnecting the second gear portion of said member and said blades whereby movement of said member relative to said hub will adjust the pitch position of said blades, fluid pressure operated means operatively connected with said toroid for effecting relative movement thereof, and means within said regulator for controlling the actuation of said fluid pressure operated means.

12. Mechanism for effecting movement of propeller blades about their longitudinal axes comprising a rotatable hub, means rotatably journalling said blades within said hub, a gear member eccentrically mounted within said hub for circular translatory movement having a plurality of circular openings, means interconnecting said rotatable blades and said gear member, actuating means for effecting circular translatory movement of said gear member, and a plurality of pivots eccentrically journalled with respect to each pivot axis in the circular openings of said gear member, said eccentrically journalled pivots connecting said gear member with said actuating means whereby said mechanism is self-locking upon failure of said actuating means.

13. In a variable pitch propeller assembly, the combination comprising a hub having a plurality of radially extending hollow spindles, a fluid pressure regulator, a stepping motor type torque unit means for varying propeller pitch, means for controlling fluid supply from said regulator to said torque unit means, an accumulator within each of said hollow spindles including a free piston disposed therein to divide each of said spindles into a gas chamber and a hydraulic chamber, a head member attached to each spindle for closing the open end thereof and a tube rigidly attached to said hub and slidably engaged by and extending through said piston, passages within said hub communicating with opposite sides of said piston, one of said passages communicating with said tube and said gas chamber, and a sleeve member disposed between said hub and said regulator providing passage means for admitting gas under pressure to said gas chamber through said tube and for supplying fluid under pressure to said hydraulic fluid pressure chamber.

14. Mechanism for effecting movement of propeller blades about their longitudinal axes including, a hub, means rotatably journalling said blades within said hub, a toothed member eccentrically mounted within said hub for circular translatory movement, actuating means for effecting circular translatory movement thereof, a control system operatively disposed with said actuating means, crank pins journalled in said toothed member and disposed to rotate about attached eccentric pintle portions, said crank pins operatively connecting said toothed member and said actuating means, means interconnecting said toothed member and said blades whereby circular translatory movement thereof will effect movement of the blades about their longitudinal axes, said eccentrically mounted member automatically locating at the dead center position of any of said crank pins upon any malfunction occurring in said control system.

15. The mechanism of claim 14 in which said actuating means includes a plurality of piston and cylinder combinations, said cylinders being attached to and rotatable with said hub, said pistons being attached to and rotatable with said hub, said pistons being disposed in said cylinders and mounted for reciprocal movement therein and operatively connected to said crank pins, and said control system including means for applying fluid pressure in predetermined sequence to said cylinders to effect relative movement of said eccentrically mounted toothed member.

References Cited in the file of this patent

UNITED STATES PATENTS

| | | |
|---|---|---|
| 1,027,252 | Isaacson | May 21, 1912 |
| 1,467,773 | Bennett | Sept. 11, 1923 |
| 1,856,529 | Zerbi | May 3, 1932 |
| 2,086,097 | Shoemaker | July 6, 1937 |
| 2,161,917 | Forsyth et al. | June 13, 1939 |
| 2,284,763 | Olson | June 2, 1942 |
| 2,296,288 | Martin et al. | Sept. 22, 1942 |
| 2,382,389 | Benedek | Aug. 14, 1945 |
| 2,392,364 | Caldwell et al. | Jan. 8, 1946 |
| 2,417,873 | Huber | Mar. 25, 1947 |
| 2,474,143 | Forsyth | June 21, 1949 |
| 2,583,872 | Newcomb | Jan. 29, 1952 |
| 2,604,951 | Benedek | July 29, 1952 |

FOREIGN PATENTS

| | | |
|---|---|---|
| 726 | Great Britain | of 1912 |